United States Patent [19]
Ramde

[11] Patent Number: 5,598,802
[45] Date of Patent: Feb. 4, 1997

[54] HULL CONFIGURATION

[76] Inventor: Roar R. Ramde, Rogestien No. 4, Horten, Norway, 3189

[21] Appl. No.: 230,640

[22] Filed: Apr. 21, 1994

[51] Int. Cl.$^6$ ........................................ B63B 1/04
[52] U.S. Cl. .............................. 114/56; 114/167
[58] Field of Search ....................... 114/56, 57, 167

[56] References Cited

U.S. PATENT DOCUMENTS

| | | | |
|---|---|---|---|
| 2,191,904 | 2/1940 | Baker | 114/56 |
| 3,934,531 | 1/1976 | Allen | 114/63 |
| 4,550,673 | 11/1985 | Ingvason | 114/56 |

FOREIGN PATENT DOCUMENTS

| | | | |
|---|---|---|---|
| 0134767 | 3/1985 | European Pat. Off. | 114/56 |
| 112414 | 1/1900 | Germany . | |
| 775706 | 5/1957 | United Kingdom . | |
| 1295211 | 8/1972 | United Kingdom . | |

OTHER PUBLICATIONS

Lloyd's Register, *Lifting Appliances & Materials Handling*, Advertisement for Marine Lifting Appliances, Cover Photo.

Dev George, *Shape of Things to Come: PG's Revolutionary Ramform Seismic Ship*, Offshore, vol. 54, No. 5, May 1994, pp. 45–50.

Schiff & Hafen, *Ungewöhnlicher Neubau fährt mit Schottel–Antrieben*, Jun. 1994.

Article produced by Schiff & Hafen Oct. 1993.

Jane's Defence Weekly, *Norway Reveals New Intelligence Ship*, Nov. 1993.

Schottel Report, *New Ships*, No. Jul. 1994.

*Primary Examiner*—Sherman Basinger
*Attorney, Agent, or Firm*—Bardehle, Pagenberg, Dost, Altenburg, Frohwitter, Geissler & Partners

[57] ABSTRACT

A new displacement hull configuration providing for homogenous flow of water under the stern including side-hull bulges that are relatively constant in size from the bow to mid-ship and tapering off to about zero at the stern. Additionally, the hull is provided with a slope surface forming an angle of below about 14° between the base line of the ship near mid-ship and a line extending from that point to another point on the surface to about 0.2 L from the stern, where L is the length of the ship.

16 Claims, 4 Drawing Sheets

HULL CONFIGURATION

BACKGROUND OF THE INVENTION

This invention relates to ship hull designs, and in particular to hulls made of the sinusoidal water-line variety, an example of which is described in European Patent 0 134 767 B1, issued to Ramde, incorporated herein by reference. Hereinafter, such a hull may be referred to as a "Ramform" hull. A Ramform hull is characterized as having squarely cut off, approximately sinusoidal waterlines around the design waterline. These features are illustrated in FIG. 1 which shows a top plan view of a hull made according to an embodiment of the invention.

The waterlines appear approximately sinusoidal, because, as shown in the top view of FIG. 1, each side of the hull appears to be approximately one half of a wave length of a sign wave.

FIG. 1 also shows that the sinusoidal waterlines appear squarely cut off at the stern. In other words, the water line at the stern would form a line normal, or "square," to the center line of the ship which intersects, or "cuts off," the sinusoidal waterlines. Such a hull, in comparison to conventional hull designs makes it possible to improve a vessel's deadweight tonnage transverse stability, navigational and sailing properties and to reduce stresses on the hull beam whether the vessel is sailing in quiet water or into the waves.

As explained in the Ramde patent, at given main dimensions of length, breadth and depth to the design waterline, conventional hull configurations can obtain greater deadweight tonnage by increasing the fullness of the underwater portion of the hull, thereby increasing the total displacement. To improve the transverse stability of a conventionally formed hull, expressed as a higher initial metacenter, the breadth of the hull can be increased to obtain a greater moment on inertia at the waterline, optionally also raising the volumetric center of gravity of the underwater hull.

However, changes of this nature (increasing displacement and beam), as demanded for transverse stability and speed increase, will eventually result in an unacceptable increase in a conventional vessel's resistance to propulsion in quiet waters as well as in heavy waves.

To improve the seagoing properties of a conventional hull configuration, expressed as the vessel's angular movements about a transverse axis (pitching), vertical movements (heave), accelerations and the amount of increase in propulsion resistance compared to the resistance in quiet seas, one seeks to alter the vessel's natural frequency of pitching and heaving so that this frequency, insofar as possible, does not coincide with the frequency of the wave lengths which the vessel encounters.

In the case of conventional hull designs, structural alterations result in only slight improvements in the seagoing properties of the vessel, and extreme pitching and heaving movements and a great increase in the resistance to propulsion will occur when the ship is sailing into the waves when the prevailing wave length is approximately equal in the ship's length at the waterline.

Depending on the type vessel and its rate of speed, such synchronous movements always make it necessary for a conventional ship to reduce speed or alter course in relation to the waves, thereby altering the cycles of encounter with the waves so that the wave period does not coincide with the natural frequency of the vessel's pitching and heaving.

The earlier Ramde patent taught the use of certain relationships which have been found to be non-optimal. Also, other differences have been found that make substantial improvements in the performance of ships designed according to the earlier Ramde patent, as well as curing problems found in the use of such ships.

SUMMARY OF THE INVENTION

The seagoing properties of the hull configuration of the present embodiments of the invention are improved, such that the hull's pitching and heaving movements are reduced, compared to the movements of conventional hulls travelling at the same rate of speed, as well as the previous Ramform hulls, and these movements are also retarded such that the improved hull does not exhibit correspondingly large movements until the wave length/hull length ratio is more than twice as large, while at the same time the improved hull's resistance to propulsion is reduced to a similar degree. Also, the present invention provides for very smooth, substantially homogeneous, two-dimensional flow of water under the hull and past the stern, resulting in very low turbulence, and very quiet running. Further still, the present invention provides for an improved propulsion placement to take advantage of the smooth water flow.

According to various embodiments of the present invention, there is provided a ramform-type hull with a sloped surface forming an angle of below about 14 degrees between the base line of the ship near the centerplane and a line extending from the transom stern to another point on the surface at about 0.2 L from the stern, where L is the length of the ship. Further in accordance with various embodiments there is provided a Ramform-type hull with a Froude number of between about 0.1 and below about 0.35, and a bulge on each side of the hull is formed near the bottom of the ship, being relatively constant in size from the bow to midship and tapering off to about zero at the stern. Further in accordance with embodiments of the invention, the two bulges continue beyond the bow to merge into an upward tilting member substantially below the design waterline and extending to about the surface of the design waterline.

According to still a further embodiment of the invention, there is provided a ship of a displacement type with a Ramform type hull, having squarely cut off longitudinally approximately sinusoidal waterlines; a sloped surface at the bottom of the aft part of the ship, formed between a base plane and the stern of the ship; said sloped surface forming an angle with the base plane and tangentially extending into said base plane approximately at L/2; said angle of said sloped surface related to the base line and a line connecting a first point in a longitudinal ship section parallel or equal to the centerplane section at the lower edge of the transom stern and a second point in the same section as the first one in the sloped surface at 0.2 L. According to a specific embodiment, the angle of said sloped surface is about 12.5°. According to a still further embodiment, the Froude-No. of the ship is between about 0.1 and about 0.3.

According to still a further embodiment, there is provided a ship of a displacement type with a Ramform type hull having substantially squarely cut off longitudinal and approximately sinusoidal waterlines comprising; a sloped surface on the bottom of the ship, formed between a base plane and the stern of the ship; said sloped surface forming an angle with the base plane and tangentially extending into said base plane approximately at L/2; and a bulge on each side of the hull arranged from the bow to the edge of the transom stern. According to a more specific embodiment, said bulge is relatively constant in size in the range from the bow to L/2 and continuously decreasing in size from L/2 to nearly about zero towards the edge of the transom stern. Further, said bulge at the transversal midship section (L/2) has a maximum normal distance related to the longitudinal centerline, which is larger by about 0.03 to 0.04 Bmax than the distance at the designed waterline. According to still a further embodiment of the inventions, there is provided a ship of a displacement type with a Ramform type hull, comprising squarely cut off longitudinally approximately sinusoidal waterlines; a sloped surface at the bottom of the ship, formed between a base plane and the stern of the ship, said sloped surface forming an angle with the base plane and tangentially extending into said base plane approximately at L/2; a bulb, which at the transverse cross section midway between the forward perpendicular and a transverse section through the uppermost portion of the bulb, has a width larger than a height with a flattened upper surface and which foremost upper range is raised up to about the waterline. According to a more specific embodiment, the length of said bulb measured from the forward perpendicular up to the cross section corresponding to the upper most portion of said bulb ranges from between about 0.1 to 0.12 Bmax, and the cross section of said bulb at the middle of said length has a width/height ratio of about 1.7. Further in accordance with this embodiment, control surfaces are arranged at each of the sidemost portion of the transom stern. For example, the control surfaces are fins, according to one embodiment, provided with controllable flaps at their aft ends at about one third of the longitudinal extension of their cross section. According to still a more specific embodiment of the invention, the ship has an L/B ratio of between 1.4 to less than 2, for example, 1.8.

According to a still further embodiment of the invention, the ship includes a dieselelectric power plant, which is arranged in a power station located at the forepart and uppermost deck of the ship, and the ship further includes an increased deck area, which is prolonged up to the aftmost extension of the fins, and which is supported by an extended hull structure above the waterline with an open transom stern.

According to still a further embodiment of the invention, there is provided a ship of a displacement type with a Ramform type hull, comprising a squarely cut off longitudinally approximately sinusoidal waterlines; a sloped surface at the bottom of the ship, formed between a base plane and the stern of the ship; said sloped surface forming an angle with the base plane and tangentially extending into said base plane approximately at L/2; the bulges on each side of the hull arranged from the bow to the edge of the transom stern terminating at about the stem area of the ship by merging into each other forming a tongue-like shape with a flattened upper surface and raising up to about the waterline.

The preceding embodiments are given by way of example, only. No limitation of the invention is intended by the inclusion of any particular feature or combination in the preceding examples, as it will be clear to a person of ordinary skill that the invention lends itself to other embodiments.

Figure 1:
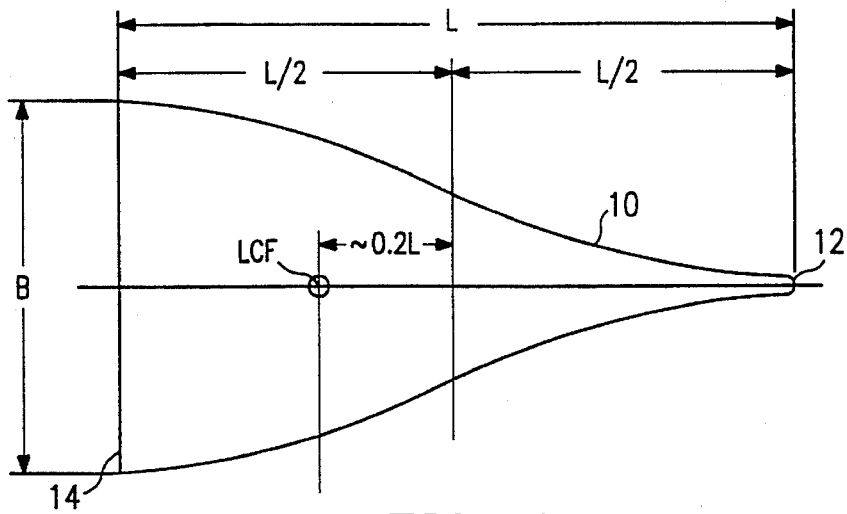
FIG. 1 is a top plan view of a hull made according to an embodiment of the present invention.

DETAILED DESCRIPTION OF THE INVENTION:

Referring now to FIG. 1, according to one embodiment of the present invention, there is provided a hull 10 with more rounded lines than conventional hull configurations, expressed by the term for leanness of line $L/V^{1/3}$, where L is the length of the hull at the design waterline (dwl) corresponding to the depth T to the summer fleeboard (see FIG. 2), and V is the displacement volume of the hull at the design waterline. Further according to this embodiment, $L/V^{1/3}$ is about 3 or greater, but the specific resistance to propulsion compared to conventional hull configurations is not increased. At the same time, the present embodiment provides that the hull beam B is such that the L/B ratio is between about 1 and about 2, preferably between about 1.4 and 1.9. The preferred ratio has been found to be about 1.8. According to this embodiment, B is the maximum beam of the hull at the design waterline (dwl). According to this embodiment, the height of the metacenter of the hull 10 is more than doubled in relation to conventional hull configurations of the same length.

According to a further embodiment of the invention, the displacement distribution in the longitudinal direction approximates Rayleigh wave. Such a wave is accomplished in the present embodiment with substantially squarely cut off, approximately harmonic sinusoidal waterlines (FIG. 2: dwl, 1, 2, 3) with extremity or stationary points 12 and 14 at the ends of the hull fore and aft, while at the same time the base lines of the waterlines ($O_{dwl}$, $0_1$, $0_2$, $0_3$) from the design waterline (dwl) and at increasing depths from this gradually are displaced in the direction of forward propulsion, shortened so far that an approximately oblique surface (s), which may be straight, is defined. Further in accordance with this embodiment, surface (s) which comprises the stern half of the hull 10 and permits utilization of various propulsion systems.

Figure 4:
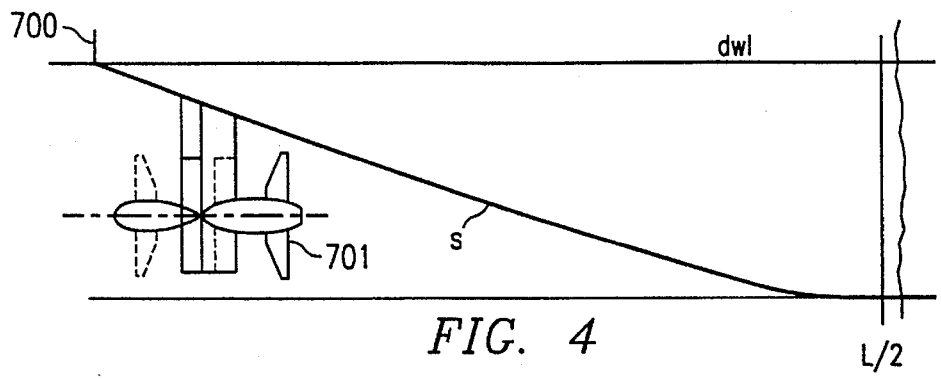
FIG. 4 is a side view of the aft portion of the hull of FIG. 1.

One such propulsion system is disclosed in the Ramde European '767 patent, wherein the propeller (f) is shown substantially parallel to the approximately oblique surface (s). Such a design was believed to afford advantages with that particular non-conventional hull, to take advantage of water flow parallel to the surface (s). However, according to an embodiment of the present invention, the axis of the propeller is mounted to be substantially parallel to the baseline of the ship, as seen in FIG. 4.

Figure 2:
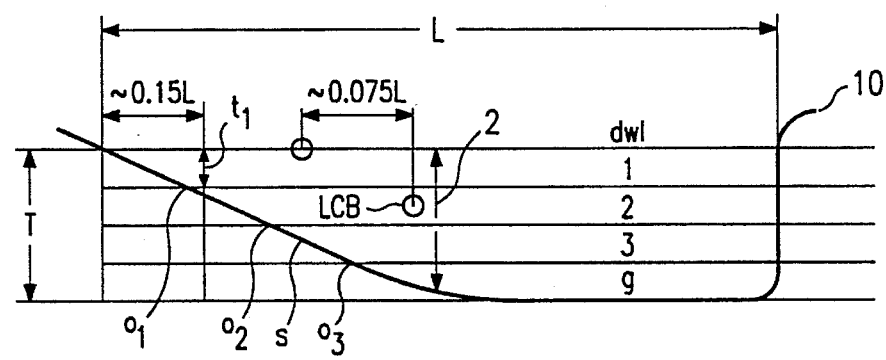
FIG. 2 is a side elevation of the hull of FIG. 1.
Figure 3:
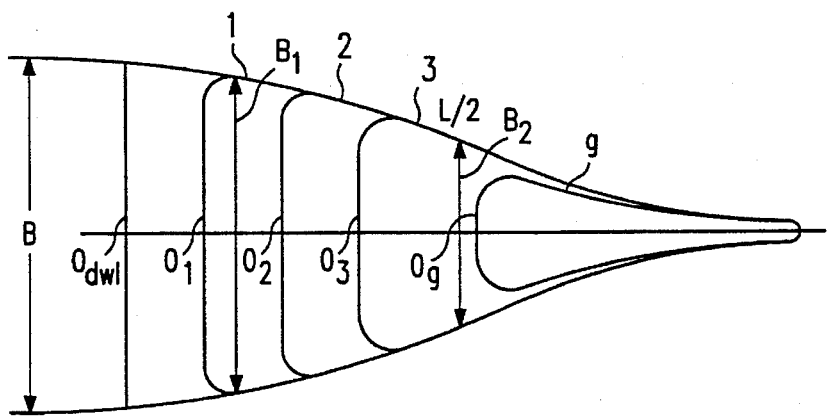
FIG. 3 is bottom plan view of the hull of FIG. 1.

Referring now to FIGS. 2 and 3, according to a further embodiment of present invention, a ratio B1/t1 is defined at a transverse section through the hull 10 below the design waterline (dwl) at a distance of about 0.15 L from the stern, wherein (B1) is the beam at the design waterline (dwl) and (t1) is the depth of the hull (measured from the same waterline). According to this embodiment, the ratio B1/t1 is about 15. According to an alternative embodiment, the ratio B1/t1 is greater than the corresponding ratio for a section at L/2 where the beam (B2) and depth ($t_2$) are measured in the same way.

According to a further embodiment of the invention a further hull ratio $e=C_P/C_{dwl}$ is defined, wherein $C_P$ is the hull's longitudinal prismatic coefficient, expressed from the following equation:

$$C_P=V/(A_{L/2}\times L),$$

and wherein $C_{dwl}=A_{dwl}/LB$, wherein L is the design waterline, A is the area of a transverse section up to the waterline at L/2, V is the displacement volume to the design waterline, $A_{dwl}$ is the waterline area, and B is the maximum beam at the waterline. According to this embodiment, the hull parameter e is about 1 or greater.

Referring again to FIG. 1 according to a further embodiment of the invention, the design waterline's areal center of gravity (LCF) is located around 0.2 L aft of midship, and the improved hull's volumetric center of gravity (buoyancy) (LCB) at the depth of the design waterline (dwl) around 0.075 L forward of areal center of gravity, which may be expressed as LCF–LCB=0.075 L.

Figure 5:
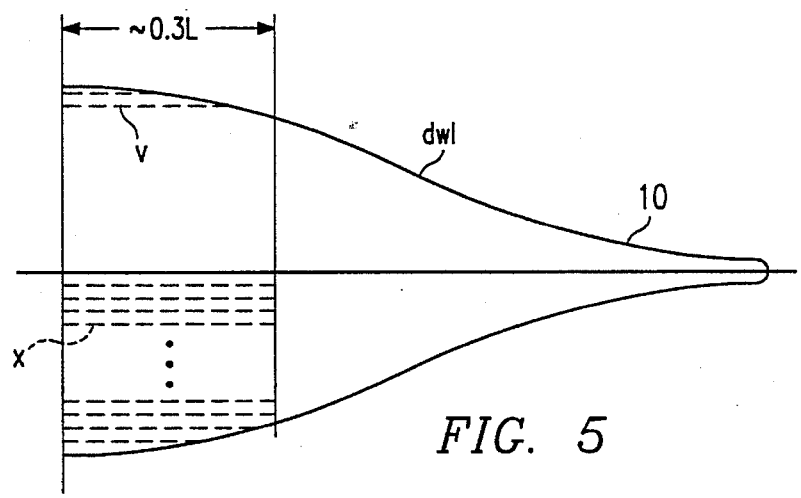
FIG. 5 is a bottom plan view of a hull made according to an embodiment of the present invention.

Referring now to FIG. 5, according to a further embodiment, hull 10 is configured in the region from the stern post and forward to about 0.3 L be provided with turbulence-controlling appendages (for example, fixed or flexible fin-like means (v)) in the streamline direction mounted approximately perpendicular relative to the hull 10 and located approximately at the transition between the bottom and sides of the hull. According to another example, the turbulence-controlling appendages are longitudinal grooves in the form of pointed, rectangular or wave-like grooves (x) which decrease in depth in the direction of forward propulsion, and which, at about 0.3 L from aft, terminate in and coincide with the even portion of the oblique surface (s) and whose depth (d) will usually be about 0.02 B.

Referring again to FIG. 1, the hull 10 is shown with the approximately harmonic sinusoidal waterlines around the design waterline (dwl) with extremity points around the hull's bow and stern ends with, wherein the areal center of gravity (LCF) is about 0.2 L aft of L/2 and where the length/breadth ration L/B of the design waterline is about 2.

FIG. 2 shows the an embodiment of the invention's hull below the design waterline (dwl) in vertical section, where it is seen that the base lines are substantially squarely cut off. Further in accordance with this embodiment, there are approximately harmonic sinusoidal waterlines ($0_{dwl}$, $0_1$, $0_2$, $0_3$) along a sloped generally planar surface (s), which are displaced in the direction of forward propulsion of the vessel, and which coincide with the base plane (g) at about L/2. Further, the distance between the areal center of gravity (LCF) and the buoyancy center of gravity (LCB) of the hull 10 at the depth of the design waterline (dwl) is about 0.075 L. The generally planar surface (s) in some embodiments takes the form of a curved surface with a very large radius, (for example between about 3 and about 5 times the maximum beam, and in a specific embodiment, about 4)

In FIG. 3, the hull configuration of FIG. 2 is shown in horizontal projection with the waterlines dwl, 1, 2, 3 and g in the examples with a U-frame at the bow end of the hull. According to alternative embodiments of the invention, other known frame forms are used. The embodiment of FIG. 3 also has a ratio between beam and depth for a section around 0.15 L from the stern and at L/2, where the respective beams and depths are designated $B_1$ and $B_2$ and $t_1$ and $t_2$.

Figure 6:
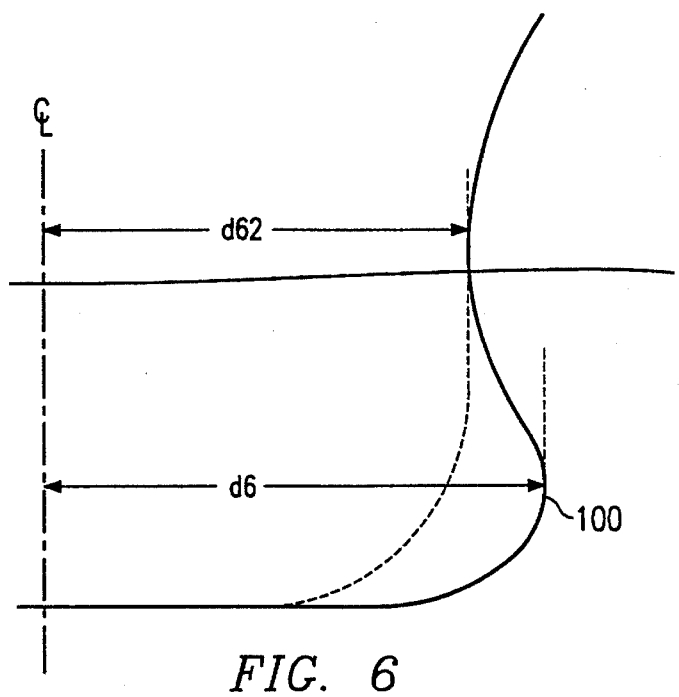
FIG. 6 is a sectional view of one half of the hull of FIG. 1 at L/2.

According to still a further embodiment of the invention, there is provided a bulge 100, as seen in FIG. 6, running from the stern to the bow. According to such embodiment the bulge 100 has a maximum normal distance (d6) from the longitudinal center line which is larger by between about 0.03 and about 0.04 of the maximum beam than the distance (d62) between the centerline and the hull at the design waterline (dwl) at L/2.

Figure 7:
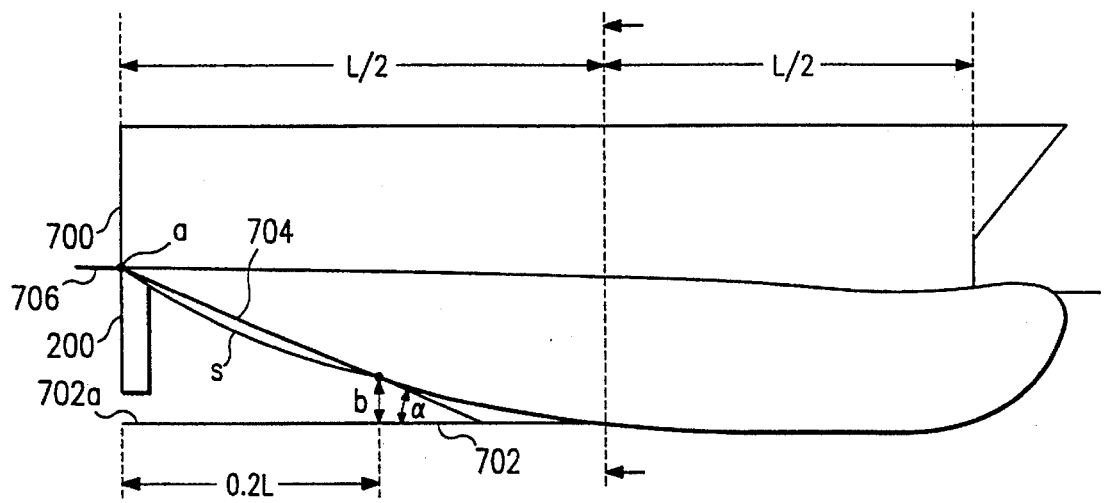
FIG. 7 is a side view of a hull made according to an embodiment of the present invention.
Figure 7A:
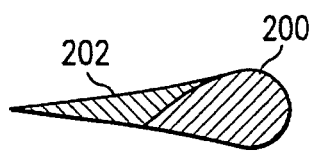
FIG. 7A is a cross section of an element provided according to an embodiment of the present invention.

Referring now to FIG. 7, according to still a further embodiment of the invention, there is provided stabilizing fins 200, having a generally teardrop cross-section (FIG. 7A) and a control surface flap 202 as shown in FIG. 7A. According to one such embodiment, the chord length of the stabilizing fin (including the flap 202) is about 3% of L, and the control surface flap 202 has a chord length less than one percent of L. According to one embodiment, such fins 200 are placed as close to the stern corners as is practical. In one embodiment, shown in FIG. 7, the trailing edge is in the plane of the transom 700. In an alternative embodiment, (not shown) the leading edge of the fin 200 is in the plane of the transom. According to a specific embodiment, the fin 200 is about twice the chord length (including the control surface flap 202).

Referring still to FIG. 7, according to a still further embodiment of the invention, there is provided a ship of a displacement type with a ramform hull, having squarely cut off longitudinally approximately sinusoidal waterlines; a sloped surface (s) forming an angle ($\alpha$) with the base plane 702 and tangentially extending into said base plane 702 approximately at L/2; said angle ($\alpha$) of said sloped surface (s) related to the base line 702a and a line 704 connecting a first point (a) in a longitudinal ship section 706 parallel or equal to the midship section at the lower edge of the transom stern and a second point (b) in the same section as the first one in the sloped surface at point 0.2 L. According to a specific embodiment, the angle ($\alpha$) of said sloped surface(s) is about 12.5°.

Figure 8A:
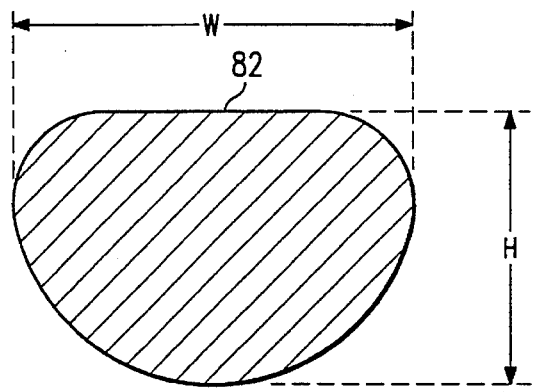
FIG. 8A is the principal cross section taken through line A of FIG. 8.
Figure 8:
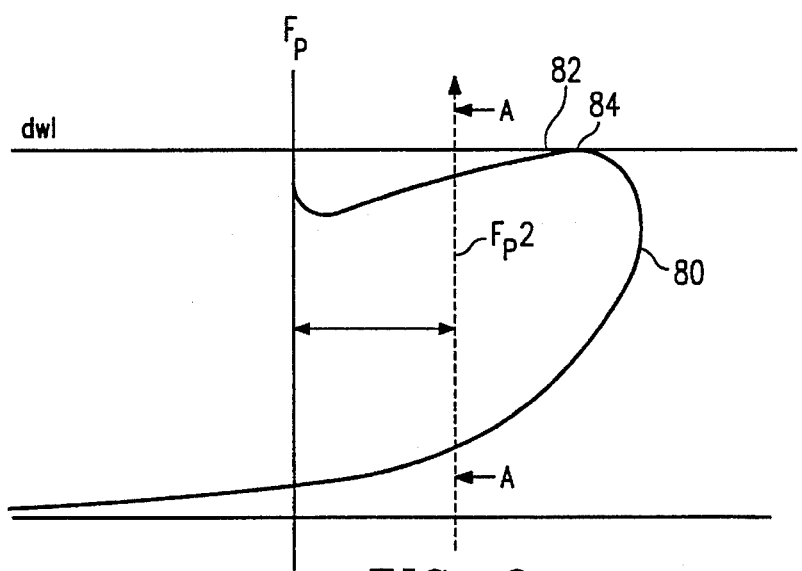
FIG. 8 is a side view of an the bow of a hull made according to an embodiment of the present invention.

According to still a further embodiment, seen in FIGS. 8 and 8A, a bulb 80 is provided at the bow of the hull, substantially below the waterline dwl. According to this embodiment, bulb 80 has a width larger than its height at the transverse cross section midway between the forward perpendicular and a transverse section through the uppermost portion of the bulb. Such a bulb 80 further has a flattened upper surface 82 the foremost upper range 84 of which is raised up to about the waterline (dwl).

According to still a further embodiment, the bulb is provided with an upper bulb surface 82, in which the uppermost portion 84 of the upper bulb surface 82 is located at about the design water plane (dwl), and the cross sectional width of the bulb (w) is greater than the cross sectional height (h) of the bulb at a transverse cross section midway between a first transverse forward perpendicular plane (fp) located at a distance L from the transom stern and a second transverse forward perpendicular plane (fp2) passing through the uppermost point 84 of the bulb.

Figure 9:
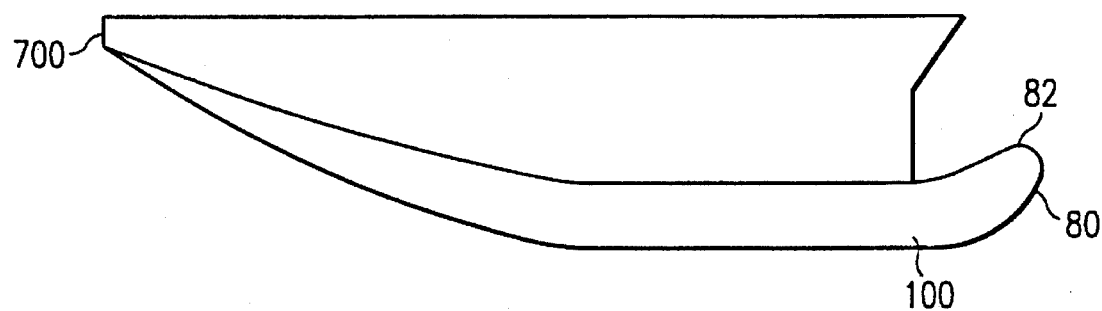
FIG. 9 is a side view of a hull showing how the bulb is formed as an integral part of bulge.
Figure 10:
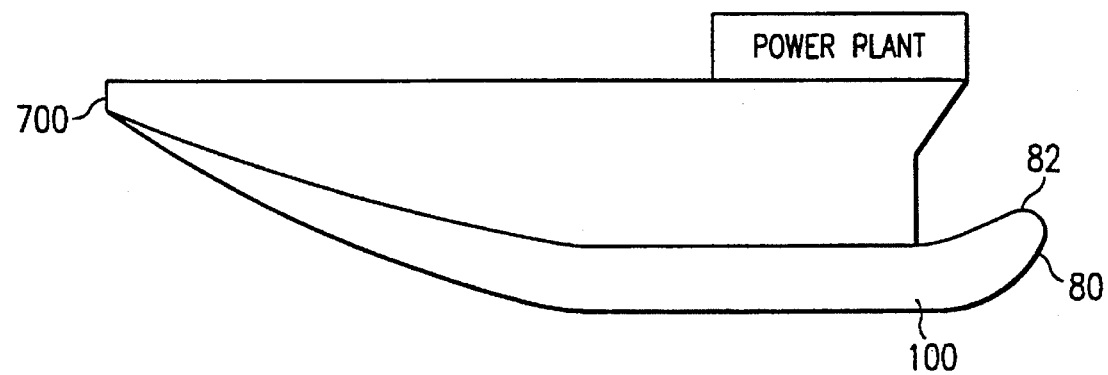
FIG. 10 shows the diesel-electric power plant and the deck it is located upon.

Referring now to FIG. 9, an embodiment is shown in which bulb 80 is formed as an integral part of bulge 100 and a corresponding bulge (not shown) on the opposite side of the hull, which run from the bow to the edge of the transom 700. In this embodiment, the bulges terminating at about the stem area of the ship by merging into each other forming a tongue-like shape 80 with a flattened upper surface 82.

Further embodiments will occur to those of skill in the art, the above embodiments given by way of example, only.

What is claimed:

1. A ship of a displacement type with a transom stern, a longitudinal length of L, and defining a base plane, a longitudinal perpendicular center plane, and a design waterline plane, the ship comprising:
   approximately sinusoidal waterlines; and
   a surface extending from the transom stern at the design waterline plane to the base plane at about L/2 and defining an angle between:
   the base plane and
   an oblique plane, said oblique plane being defined by:
   a line at the intersection of the transom stern and the design waterline plane and
   a point located on said surface at about 0.2 L from the transom stern,
   a bulge in the hull, arranged along a water-contacting portion of the hull, from about the bow to about the transom stern wherein said bulge is substantially constant in size from about the bow to about L/2 and continuously decreasing in size from about L/2 to about zero at the transom stern.

2. A ship according to claim 1, wherein the furthest normal distance from the perpendicular center plane to a point on said bulge is between about 0.03 and about 0.04 Bmax.

3. A ship according to claim 1, equipped with a diesel-electric power plant located in the forepart of the ship.

4. A ship according to claim 3, wherein said diesel-electric power plant is located on the uppermost deck.

5. A ship according to claim 1, having an L/B ratio of between about 1.4 and about 2.

6. A ship of a displacement type with a transom stern, a longitudinal length of L, and defining a base plane and a design waterline plane, the ship comprising:
   approximately sinusoidal waterlines; and
   a surface extending from the transom stern at the design waterline plane to the base plane at about L/2 and defining
   an angle between:
   the base plane and
   an oblique plane, said oblique plane being defined by:
   a line at the intersection of the transom stern and the design waterline plane and
   a point located on said surface at about 0.2 L from the transom stern; and
   a bulb, said bulb comprising:
   an upper bulb surface, said upper bulb surface being substantially flat,
   an uppermost portion of said upper bulb surface, said uppermost portion being located at about the design waterline plane,
   a cross-sectional width of said bulb, said cross-sectional width being greater than a cross-sectional height of said bulb at a transverse cross-section, said transverse cross-section being located midway between:
   a first transverse forward perpendicular plane located at a distance L from the transom stern, and
   a second transverse forward perpendicular plane passing through an uppermost point on the bulb.

7. A ship according to claim 6, wherein a length of said bulb, from said first transverse forward perpendicular plane to said second transverse forward perpendicular plane, is between about 0.1 to about 0.12 Bmax, and
   a cross section of said bulb at the middle of said length has a width/height ratio of about 1.7.

8. A ship according to claim 6, wherein a length of said bulb, from said first transverse forward perpendicular plane to said second transverse forward perpendicular plane, is between about 0.1 to about 0.12 Bmax.

9. A ship according to claim 8, wherein a cross section of said bulb at the middle of said length has a width/height ratio of about 1.7.

10. A ship according to claim 6, equipped with a diesel-electric power plant located in the forepart of the ship.

11. A ship according to claim 10, wherein said diesel-electric power plant is located on the uppermost deck.

12. A ship according to claim 6, having an L/B ratio of between about 1.4 and about 2.

13. A ship of a displacement type with a transom stern, a longitudinal length of L, and defining a base plane and a design waterline plane, the ship comprising:
   approximately sinusoidal waterlines; and
   a surface extending from the transom stern at the design waterline plane to the base plane at about L/2 and defining an angle between:
   the base plane and
   an oblique plane, said oblique plane being defined by:
   a line at the intersection of the transom stern and the design waterline plane and
   a point located on said surface at about 0.2 L from the transom stern; and
   a water-contacting bulge on each side of the hull arranged from the bow to the edge of the transom stern, said bulges joining together at about the stem of the ship defining a tongue-like shape with a flattened upper surface, said flattened upper surface located at about the design waterline plane.

14. A ship according to claim 13, equipped with a diesel-electric power plant located in the forepart of the ship.

15. A ship according to claim 14, wherein said diesel-electric power plant is located on the uppermost deck.

16. A ship according to claim 13, having an L/B ratio of between about 1.4 and about 2.

* * * * *